United States Patent [19]

Chen

[11] Patent Number: 5,710,755
[45] Date of Patent: Jan. 20, 1998

[54] COMMUNICATION SYSTEM FOR CONTROL APPLICATIONS

[75] Inventor: Ming C. Chen, Shelton, Conn.

[73] Assignee: Pitney Bowes, Stamford, Conn.

[21] Appl. No.: 152,614

[22] Filed: Nov. 15, 1993

[51] Int. Cl.[6] .................... H04L 12/40; H04G 9/02
[52] U.S. Cl. ................ 370/24; 370/85.1; 370/85.2; 370/85.9
[58] Field of Search .................... 370/85.1, 85.2, 370/95.1, 95.3, 85.7, 85.8, 85.15, 77, 31, 24, 85.3, 85.4, 85.5, 85.9; 340/825.06, 825.05

[56] References Cited

U.S. PATENT DOCUMENTS

| | | | |
|---|---|---|---|
| 4,811,338 | 3/1989 | Haruyama et al. | 370/85 |
| 4,858,222 | 8/1989 | Weimert | 370/85.1 |
| 4,949,359 | 8/1990 | Voillat | 375/106 |
| 4,955,018 | 9/1990 | Twitty et al. | 370/85.1 |
| 5,012,468 | 4/1991 | Siegel et al. | 370/85.5 |
| 5,090,013 | 2/1992 | Fadem | 370/85.1 |

FOREIGN PATENT DOCUMENTS

| | | |
|---|---|---|
| 0207313 | 6/1986 | European Pat. Off. |
| 2200818 | 8/1988 | United Kingdom. |
| 2255479 | 11/1992 | United Kingdom. |

*Primary Examiner*—Wellington Chin
*Attorney, Agent, or Firm*—Charles R. Malandra, Jr.; Melvin J. Scolnick

[57] ABSTRACT

The communication system is a cyclic, serial, multi-drop, master-slave, half-duplex protocol having data formatted into receive frames and transmit frames carried on separate wires. Both receive frame and transmit frame have the same structure and are synchronized with each other. Each frame comprises a flag byte followed by 8 device channels, each channel comprising 3 bytes space. The flag byte is used as a reference for frame synchronization. Physical connection is by way of two half duplex RS-485 multipoint links utilizing telephone cable for connection between devices.

4 Claims, 11 Drawing Sheets

FIG. 12

TRANSMIT FRAME BIT DEFINITION

| BYTE # | DATA NAME |
|---|---|
| 0 | CONTROL BYTE |
| -7 | UNUSED |
| -6 | BYTE 2 PRESENT |
| -5 | BYTE 1 PRESENT |
| -4 | DIAGNOSTIC MODE ENABLE |
| -3 | 00: NORMAL  01: GPSL LOOPBACK  10: ENABLE TEST  11: UNUSED |
| -2 | OPEN LOOP CONTROL ENABLE |
| -1 | RESET POSITION COUNTER |
| -0 | RESET MOTOR DRIVER |
| 1 | MOTOR COMMAND |
| 2 | UNUSED |

RECEIVE FRAME BIT DEFINITION

| BYTE # | DATA NAME |
|---|---|
| 0 | ENCODER POSITION BIT 0-7 |
| 1 | ENCODER POSITION BIT 8-15 |
| 2 | STATUS BYTE |
| -7 | UNUSED |
| -6 | UNUSED |
| -5 | UNUSED |
| -4 | ENCODER INDEX MARKER FEEDBACK |
| -3 | DRIVER SEEING SELF-RESET FLAG |
| -2 | DRIVER ERROR FLAG |
| -1 | RECEIVE DATA ERROR FLAG |
| -0 | FRAME ID (0 OR 1) |

FIG. 13

TRANSMIT FRAME BIT DEFINITION

| BYTE # | DATA NAME |
|---|---|
| 0 | CONTROL BYTE |
| -7 | UNUSED |
| -6 | BYTE 2 ENABLE |
| -5 | BYTE 1 ENABLE |
| -4 | DIAGNOSTIC MODE ENABLE |
| -3 | 00: NORMAL  01: GPSL LOOPBACK  10: UNUSED  11: UNUSED |
| -2 | LOCAL DEVICE RESET 2 |
| -1 | LOCAL DEVICE RESET 1 |
| -0 | I/O CARD MASTER RESET |
| 1 | I/O OUTPUT 0-7 |
| 2 | I/O OUTPUT 8-15 |

RECEIVE FRAME BIT DEFINITION

| BYTE # | DATA NAME |
|---|---|
| 0 | I/O INPUT 0-7 |
| 1 | I/O INPUT 8-15 |
| 2 | STATUS BYTE |
| -7 | UNUSED |
| -6 | BYTE 1 PRESENT |
| -5 | BYTE 0 PRESENT |
| -4 | UNUSED |
| -3 | I/O CARD SEEING SELF-RESET FLAG |
| -2 | I/O CARD ERROR FLAG |
| -1 | RECEIVE DATA ERROR FLAG |
| -0 | FRAME ID (0 OR 1) |

5,710,755

1

COMMUNICATION SYSTEM FOR CONTROL APPLICATIONS

FIELD OF THE INVENTION

The invention relates to system architectures for control applications and more particularly to a communication architecture and protocol which can be easily optimized for control of the operation of various desired functions.

BACKGROUND OF THE INVENTION

Production Mailing apparatus typically has been one of the mail handling devices least susceptible to standardization because of the disparate nature of each customer's applications and the range of volumes of mail to be handled by each different customer. Each mailing application has in the past had to be customized in order to meet the customer's needs. For the manufacturer this has required both expensive re-engineering efforts and an increase in inventory because of the necessity for a large variation in spare electronic boards and other components in order to assure satisfactory customer relations and relatively quick repairs.

It is known to modularize the stations for a stand-alone system as taught, for example, in U.S. Pat. No. 4,547,856 to Piotroski. While this has worked well, the electronic architecture is limited and accommodates only the specific operations of the large production mailing machines and does not easily allow networking with local area networks (LAN's) and other inputs and outputs of the present day devices.

U.S. Pat. No. 4,514,799 to Spencer et al. describes a bus system architecture for a microprocessor system comprising an array of bus lines for communication between and among microprocessors.

U.S. Pat. No. 4,517,637 to Cassell discloses a host system connected to devices via a local area network for operation of the various measurement and control functions. The operation program is centralized and communication with the devices occurs directly through an LAN.

U.S. Pat. No. 4,780,814 describes a global serial channel for a microcontroller while U.S. Pat. No. 4,782,439 describes an arrangement utilizing direct memory access (DMA).

None of these references teaches a flexible serial communication architecture which enable a communication scheme which avoids the problems of parallel communication while being at the same time versatile and flexible enough to be used any many different arrangements for controlling many different processes which is particularly useful for controlling devices used in production mailing devices.

SUMMARY OF THE INVENTION

It is therefore an object of the invention to provide a novel communication architecture particularly useful for production mail apparatus which will, with a minimum number of electronic boards, allow configuring to meet a large range of the various customer requirements.

Thus there is provided in accordance with the invention a master-slave communication system comprising a master node and at least one slave node, said master node comprising transmitting means for formatting and transmitting a flag signal and other data and receiving means for serial-to-parallel conversion and storage of data and said at least one slave node comprising transmitting means for formatting and transmitting data and receiving means for serial-to-parallel conversion and latching of data received from the master node, said master node and said at least one slave node being connected by transmit and receive wires for communication of data formatted into transmit frames and receive frames, said transmit frames being carried by the transmit wires which are separate from the receive wires for carrying the receive frames, the frames being cyclical and the transmit and receive frames being synchronized with each other, each said frame comprising a flag signal for synchronization followed by a determined number of channels, each said channel having a determined number of bytes corresponding thereto.

BRIEF DESCRIPTION OF THE DRAWING

FIG. 12 is a suitable bit map for control of the Universal motor drive.

FIG. 13 is a suitable bit map for use with a Serial I/O board.

DESCRIPTION OF THE PREFERRED EMBODIMENT

Figure 1:
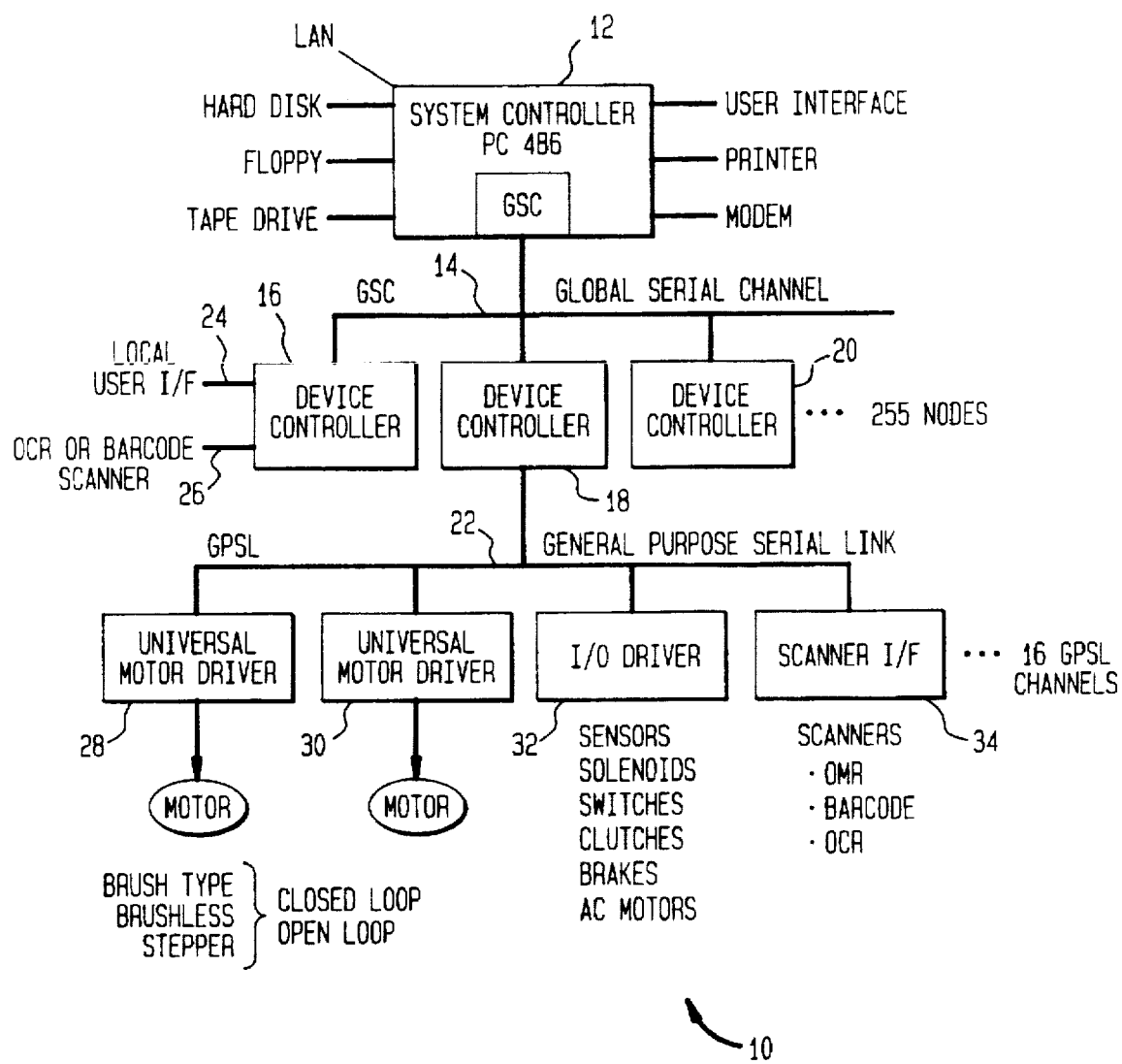
FIG. 1 is a block diagram of a control architecture in accordance with the invention showing Peer-to Peer relationships.

In FIG. 1, there is shown generally at 10 a system in accordance with the invention showing peer-to-peer relationships. The architecture of the system comprises an modular arrangement which is expandable and flexible and which is configurable with either centralized or distributed processing. This flexibility makes it applicable to a wide variety of system control applications for a range from small to very large systems.

The system architecture is shown in FIG. 1 generally at 10. As seen in this Figure, the system controller 12 is the backbone of the Global Serial Channel (GSC) network shown at 14 for the illustrated distributed multi-layer control applications. It will be understood that for smaller applications it may be configured as a centralized controller with direct access to the General Purpose Serial Link as seen below in connection with FIG. 4. The system controller 12 interfaces in conventional manner to external local area networks (LAN'S), storage media such as hard disks, floppy disks, tape drives, and the like, printers, modems, or large scale user interfaces as desired.

A plurality of Device Controllers illustrated at 16, 18 and 20, respectively, communicate on the GSC network and as required on the General Purpose Serial Link (GPSL) 22 which will be described below. The GSC is preferably an Intel bus arrangement as described in U.S. Pat. No. 4,780,814 to Hayak and marketed by Intel as the 80C152 Universal Communication Controller Chip. The device will support up to 255 device controllers only three of which are shown here.

Controller 16 is shown interfacing to the local user at port 24 and to an OCR or Barcode scanner at 26. Universal Motor Drivers 28 and 30 as well as I/O Driver 32 and Scanner I/F 34 communicate with Device Controller 18 via the GPSL 22. In a preferred embodiment, the General Purpose Serial Link 22 in accordance with the invention will be able to accommodate 16 channels of information. The GPSL channels as illustrated may be configured for motion control communication with the Motor Drivers, for I/O control or for scanner control.

The motor drivers, two of which are shown in FIG. 1 for illustrative purposes can provide both closed and open loop motion control for DC brush type motors, DC brushless motors, and DC stepper motors as desired. These drivers will be discussed further below.

The I/O Driver 32 provides control for up to 16 inputs and up to 8 outputs. The I/O as controls sensors, solenoids, clutches, brakes, actuators, and/or AC motors.

The scanner interface 34 decodes and interprets OCR scan marks and barcodes. It may also serve as an interface to serial OCR and Barcode scanners.

Figure 2:
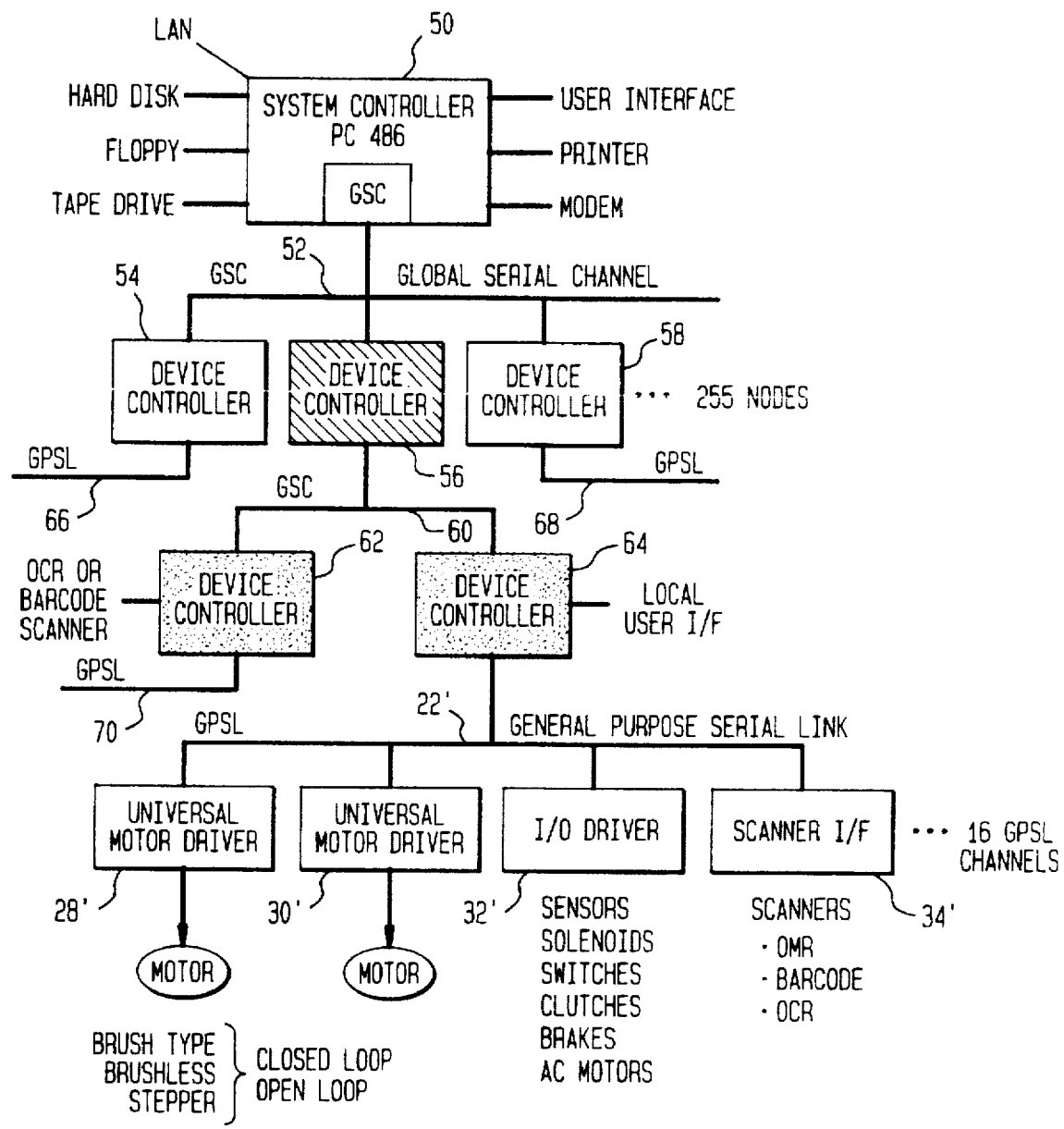
FIG. 2 is a block diagram of a control architecture in accordance with the invention showing additional master-slave Relations along with the Peer-to Peer relationships.
Figure 3:
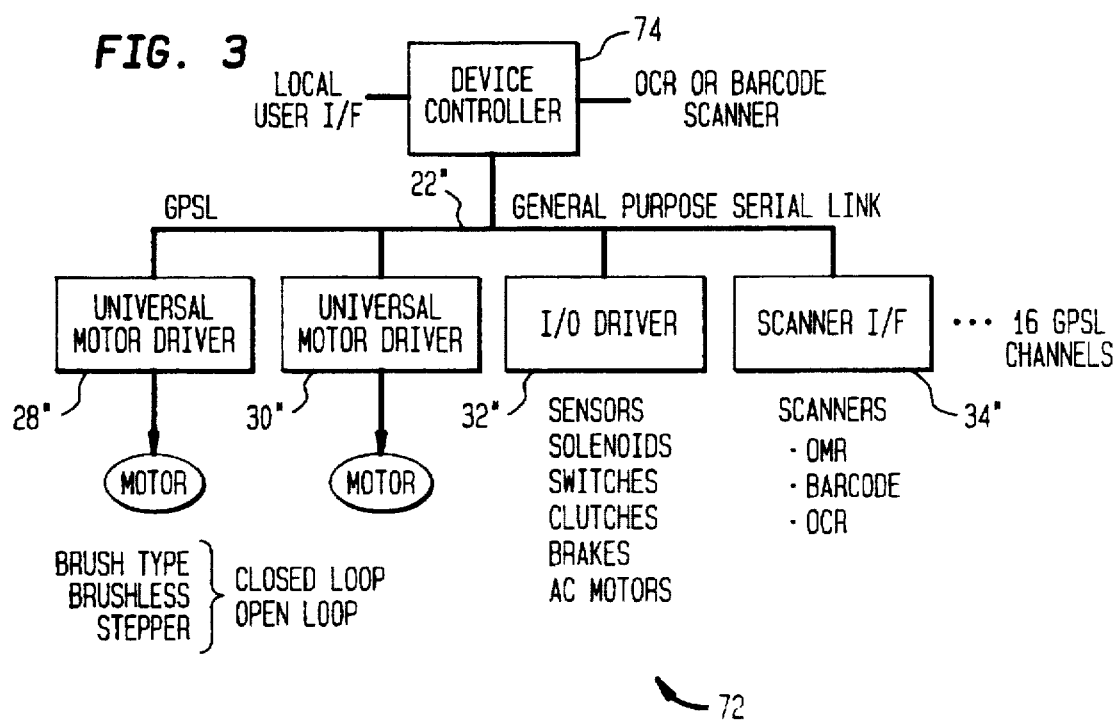
FIG. 3 is a block diagram showing a single-layer architecture using a device controller in accordance with the invention.
Figure 4:
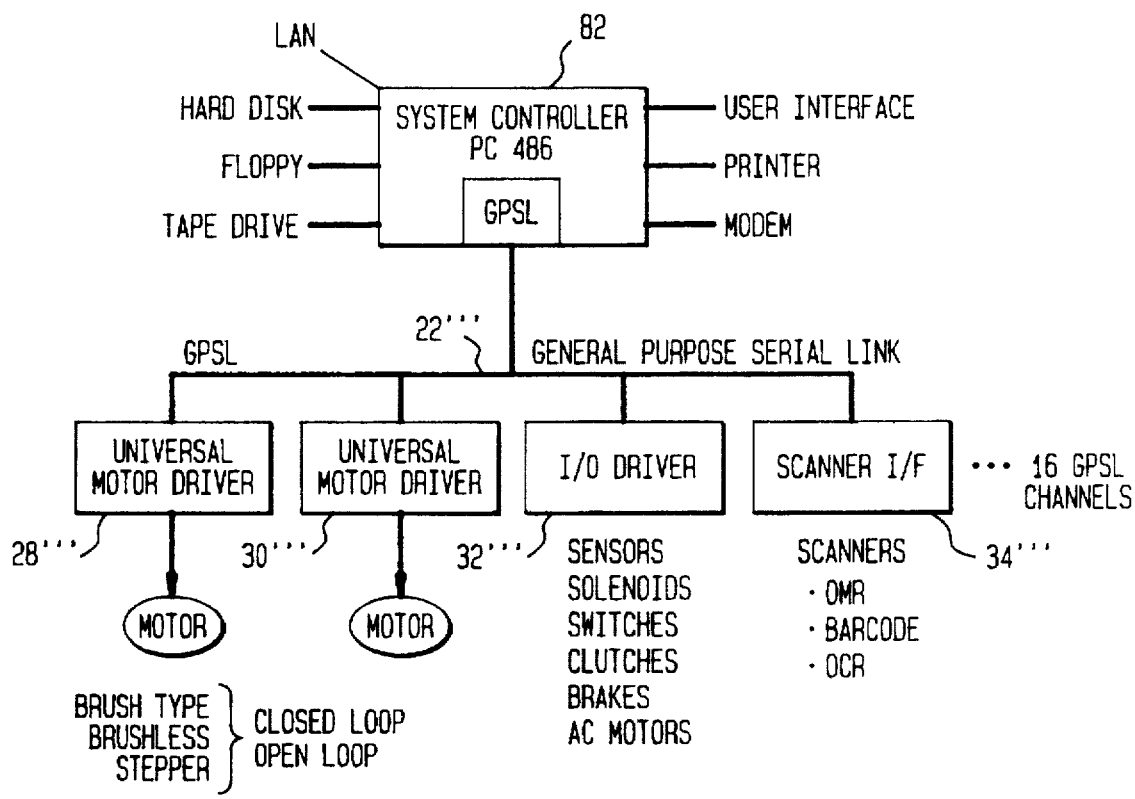
FIG. 4 illustrates a block diagram of a single-level architecture using a system controller in accordance with the invention.

FIGS. 2, 3, and 4 illustrate the flexibility of the system architecture in accordance with the invention. FIG. 2 shows a multi-layer distributed architecture utilizing both peer-to-peer and master-slave relationships. In this arrangement, the system controller 50 communicates along Global Serial Channel 52 with device controllers 54, 56, and 58, respectively. In this configuration, device controller 56 communicates on a GSC with two additional device controllers 62 and 64 in a master-slave relationship. For example the device controller 64 may control a local user interface in addition to controlling the motors and I/O and scanner interface as previously describe in FIG. 1. The parts here are labelled with primes in order to show the similarity of this layer of control. Device controllers 54 and 58 may communicate with additional devices via GPSL 66 and 68, respectively. The other device controller 62 which operates in this configuration as a slave to the master device controller 56 may, for example, interface with an OCR or Barcode scanner and communicate with other elements via the GPSL indicated at 70.

FIG. 3 illustrates an example of a single-layer centralized architecture using a device controller configured as a central controller for control of the system and is especially applicable to those systems not requiring access to external LAN's or storage media. In the example of FIG. 3, the device controller 74 interfaces with OCR or Barcode scanners using serial communication and also interfaces with the user with a "low scale" interface. Communications with the motors and other interfaces and scanners are as previously described and again the relationship is recalled by the use of double primes for the features similar to those of FIG. 1.

FIG. 4 shows an example of single layer centralized architecture using the system controller for control. In this example the system controller 82 communicates with the motors and I/O driver and scanner interface via the GPSL without intermediate device controllers. Again to illustrate the similarity, the devices and communication link are labelled with numbers bearing triple primes in correspondence with those described in connection with FIG. 1. The controller 82 provides high-level functions where access to external LAN's or storage media is required.

Figure 5:
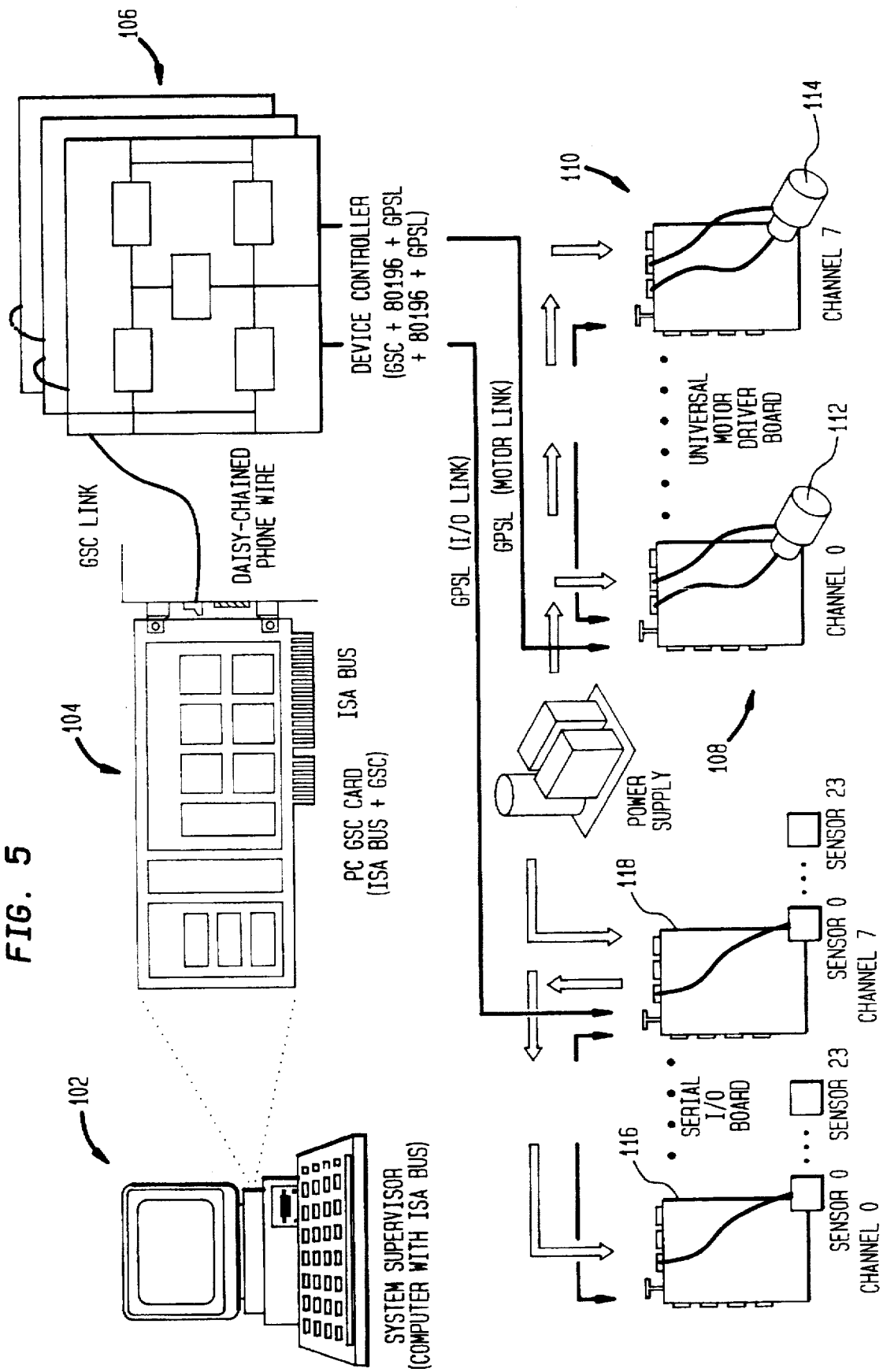
FIG. 5 is shows a system configuration for use with an inserter using the four "building block" boards in accordance with the invention.

FIG. 5 shows generally at 100 a suitable embodiment of a control system in accordance with the invention in schematic form for an inserter. The system is suitably configured with a modular design. In accordance with the invention, four different types of boards provide the building blocks. They are the system supervisor shown at 102 which includes the Global Serial Channel communication board 104 to oversee the overall system control. The next type of block is the device control board shown at 106 to perform the local control of motors and other I/O devices for each mechanical module. Another type of board, the universal motor drive illustrated at two places, 108 and 110, in the Fig. may be configured to drive a variety of motors illustrated here at 112 and 114, respectively. Serial I/O boards shown at 116 and 118 are used to interface with sensors and other I/O devices.

It will be appreciated that almost any motion control application can be implemented by use of determined combinations of these boards. A significant advantage of the use of these modules is that the architecture will shorten product development time and will reduce the cost of inventory which must be carried. Further details of the architecture of such a system may be found in Ser. No. 08/152,759, filed on even date herewith and assigned to the assignee of the instant invention which is specifically incorporated by reference herein.

Figure 6:
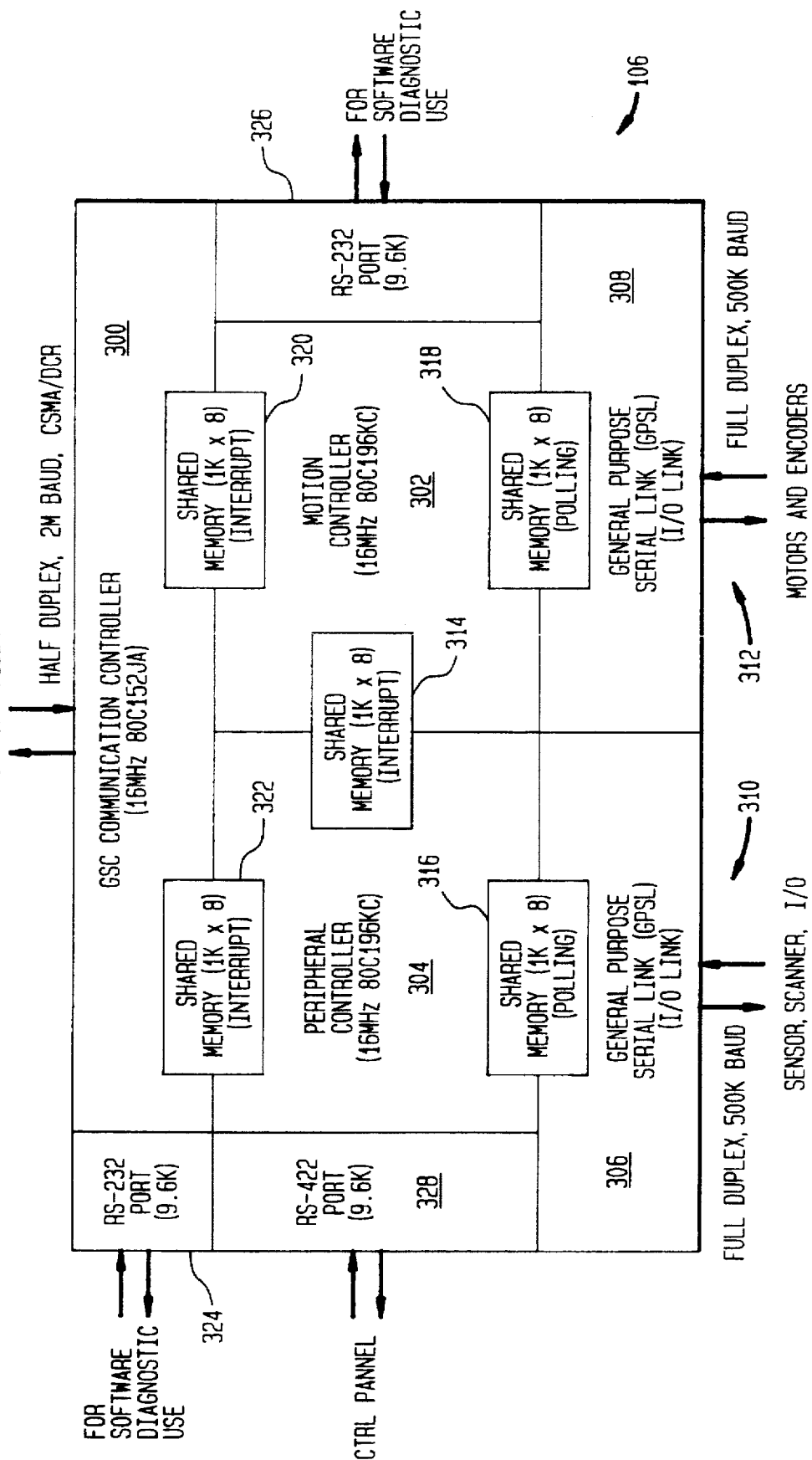
FIG. 6 is a block diagram of the device control board.

FIG. 6 is a block diagram of a device control board in accordance with the invention. The device control board indicated generally at 106 in correspondence with the board illustrated in FIG. 5 comprises five major functional blocks. As illustrated, there is a GSC communication interface 300 to communicate with the system controller and with other device controllers not shown here via GSC cable. The GSC communication interface utilizes the Intel 80C152 as described in Ser. No. 08/152,759 and will not be further described here.

Motion Controller 302 preferably comprises an Intel 80C196 based Motion Control Processor to generate motion profiles and to control up to eight motor drivers which may be either open-loop or closed-loop controlled devices not shown in this Figure.

Peripheral controller 304 preferably includes an Intel 80C196 microprocessor which can interface through the GPSL communication link described below up to 128-input lines and up to 128-output lines. It will be understood that each input to the controller can be input signals from photocells, switches and the like while the output communication may be to devices such as solenoids, indicators, and the like all of which are not shown in the Figure.

The general purpose Serial Link sections (GPSL) 306 and 308 and will be discussed below. In general terms, the link comprises full duplex, 500K Baud communication links as indicated at 310 and 312 for communication with up to eight universal motor driver boards (not shown) or eight serial I/O boards (not shown) via a serial cable (not shown).

Shared memories 314, 316, 318, 320, and 322 are preferably used as message buffers among the processors in the various sections. Other means for communicating between and among the sections will occur to those skilled in the art and may be substituted for the shared memories if desired.

The GSC Controller section also interfaces with an RS-232 port 324, as does the motion controller at 326. The peripheral controller has an RS-422 port shown at 328 instead of the RS-232 port.

The GPSL link of which the Master controllers 306 and 308 form a portion provides a cyclic, preferably 500K Baud, master-slave serial communication which is optimized for motion control protocol. Each master controller is suitably implemented in a programmable logic device (PLD).

The controllers perform the following functions. As a master node they generate a "flag" field as reference to synchronize all Slave nodes. They fetch outgoing data from shared memory and pack it in proper format to send out. They unpack incoming data and place it in the shared memory's receive buffers.

Figure 7:
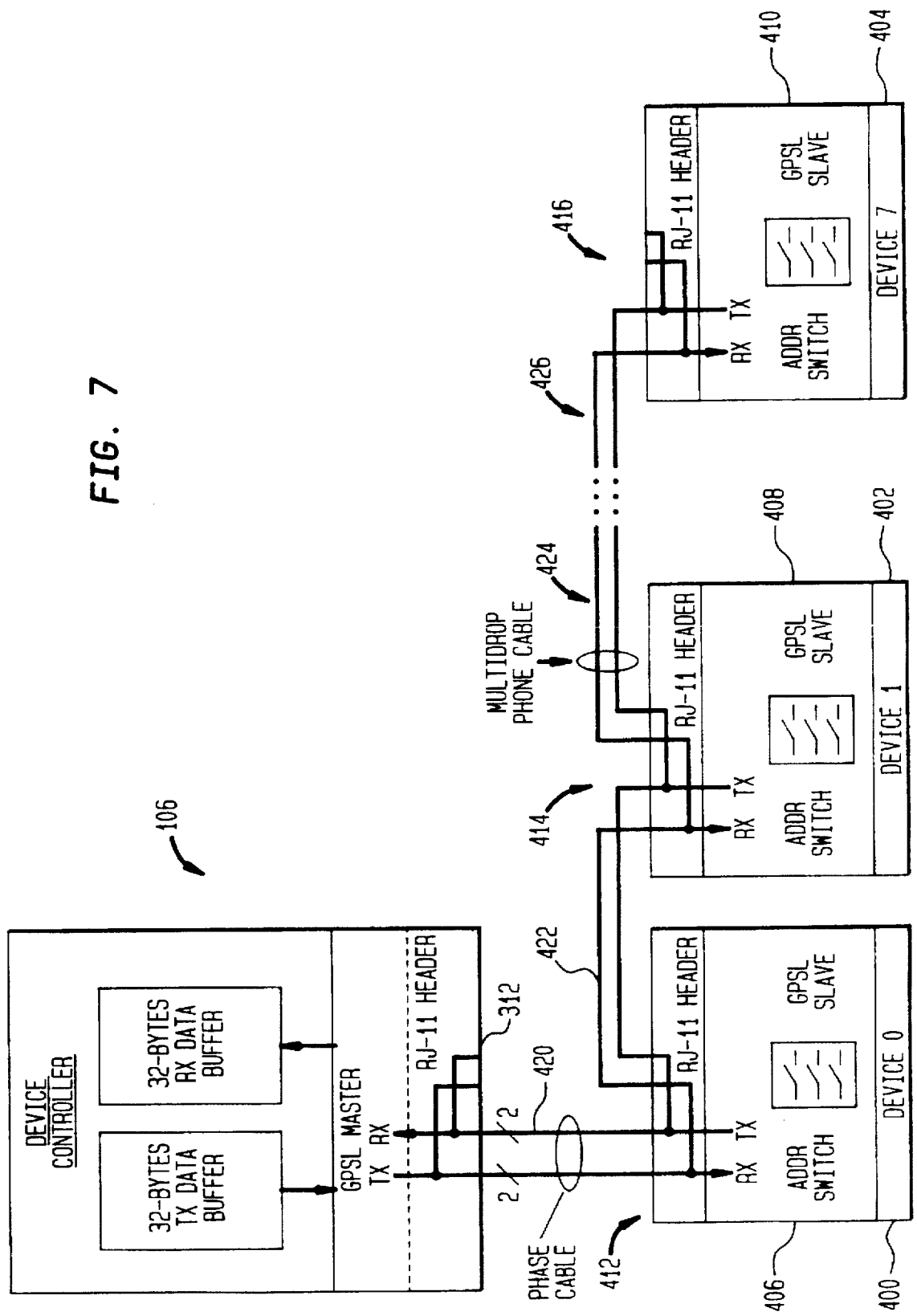
FIG. 7 is a block diagram of the GPSL communication link.

FIG. 7 is a block diagram showing a GPSL control link arrangement. The device controller 106 has two communication ports, only one of which is illustrated in FIG. 7, for example 312, for connecting to a plurality of up to eight devices each, some of which are illustrated at blocks 400, 402 and 404 Each GPSL master node is connected to up to eight slave nodes, 406, 408, 410 each communicating to its respective device and with the serial communication port 312 at respective communication ports 412, 414, and 416. The physical connection of the GPSL link is preferably implemented by two half-duplex RS-485 multipoint links. Four wire telephone cables shown at 420, 422, 424, and 426 are suitable for carrying these two pairs of differential signals, which swing between 0V and +5V. For best results, the connection modular phoned with 6-lead modular phone cable, the two extra wires being reserve for grounding purposes. Modular phone jacks (not shown) are suitable for connector receptacles.

Figure 8:
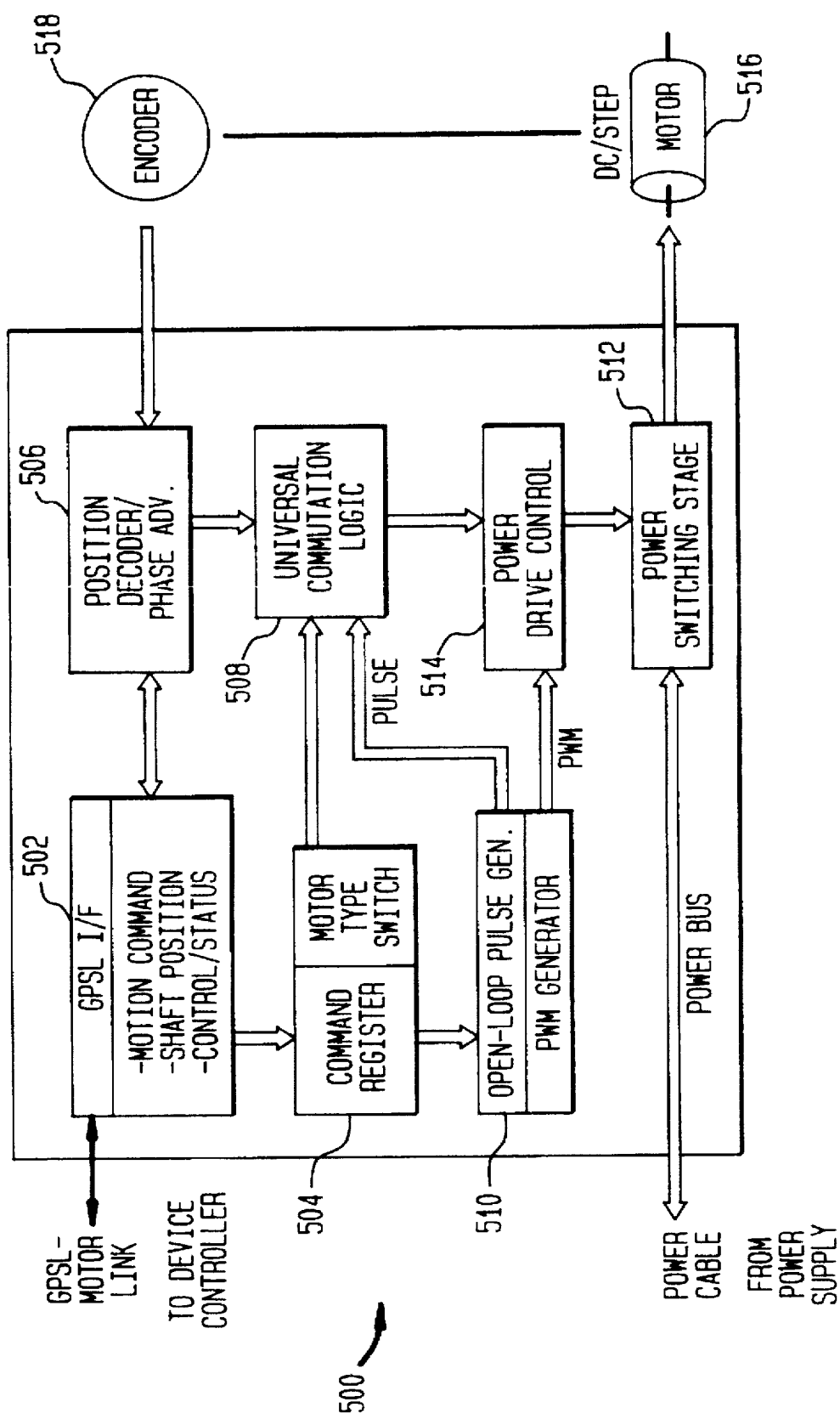
FIG. 8 is a block diagram of the universal drive board in accordance with the invention.

For best results in accordance with the invention the device controller interfaces with determined motors via a universal motor drive board such as the one illustrated at 500 in the block diagram of FIG. 8. It will be understood that the board 500 is representative of the ones shown at 108 and 110 of FIG. 5. The illustrated board 500 is a fully digital control, versatile motor driver which can drive a wide range of motors When these boards are used in conjunction with the serial link described above and in application Ser. No. 08/152,759, it will be appreciated that system integration time can be significantly reduced and system reliability increased. The significant features are a universal commutation control which can drive open- or closed-loop stepper motors, or DC or brushless motors. The board includes built-in quadrature-decoding circuitry for conventional optical encoders. The board also includes built-in "commutation phase advance" circuitry to improve high-speed performance and a built-in pulse-width-modulation (PWM) generator.

Turning now to FIG. 8, the board 500 includes a slave node 502 of the GPSL link associated with internal registers illustrated at 504. The board 500 also includes position decoder/phase advance logic shown at 506, universal commutation logic illustrated at 508 and PWM generator 510 for control of the power switching stage 512 by the power drive control block 514. The drive board is shown outputting drive information to representative motor 516 which in accordance with the invention may be a DC, DC-brushless or stepper motor. The rotor shaft position may be monitored by means of encoder 518.

Figure 9:
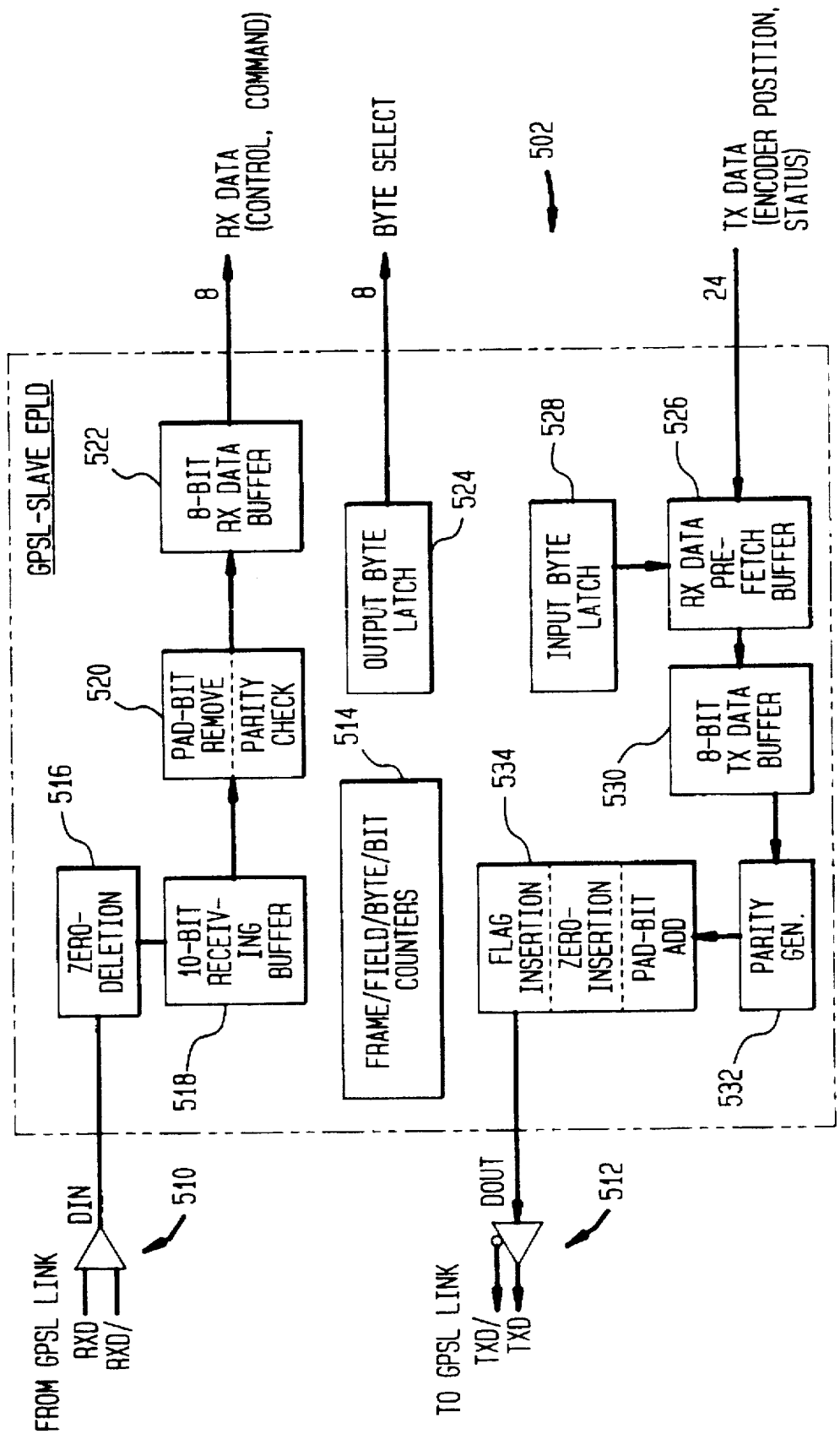
FIG. 9 is a block diagram of the GPSL slave node on the universal drive board.

FIG. 9 is a block diagram of the GPSL block 502 which provides the communication control link between the motor driver such as 500 and its associated device controller such as the device 106 of FIG. 7. The basic functions of this block are to receive the motor commands and other control signals from the device controller. It provides frame synchronization with the master node of the device controller, receives information from the controller, checks the information and latches the commands and control data into the internal registers 504 and the decoder block 506 of FIG. 8. It also collects and formats the data and drive status for transmittal to the device controller 106.

Turning now to FIG. 9, the block 502 comprises RS-485 transceivers shown at 510 and 512. The receive line data input at 510 is fed at the appropriate time, in accordance with the timing information developed in counters shown at 514, to zero-deletion block 516, buffer 518, and thence to block 520 where the parity is checked and the data, reformatted as discussed below is stored in data buffer 522. Byte selection is performed at block 524. For transmittal back to the device controller, the data, such as encoder position and status, is first placed in prefetch buffer 526 and latched by latch 528. It is transferred to buffer 530 and from thence to parity generator 532 and block 534 for transmittal in the appropriate format as described below.

Figure 10:
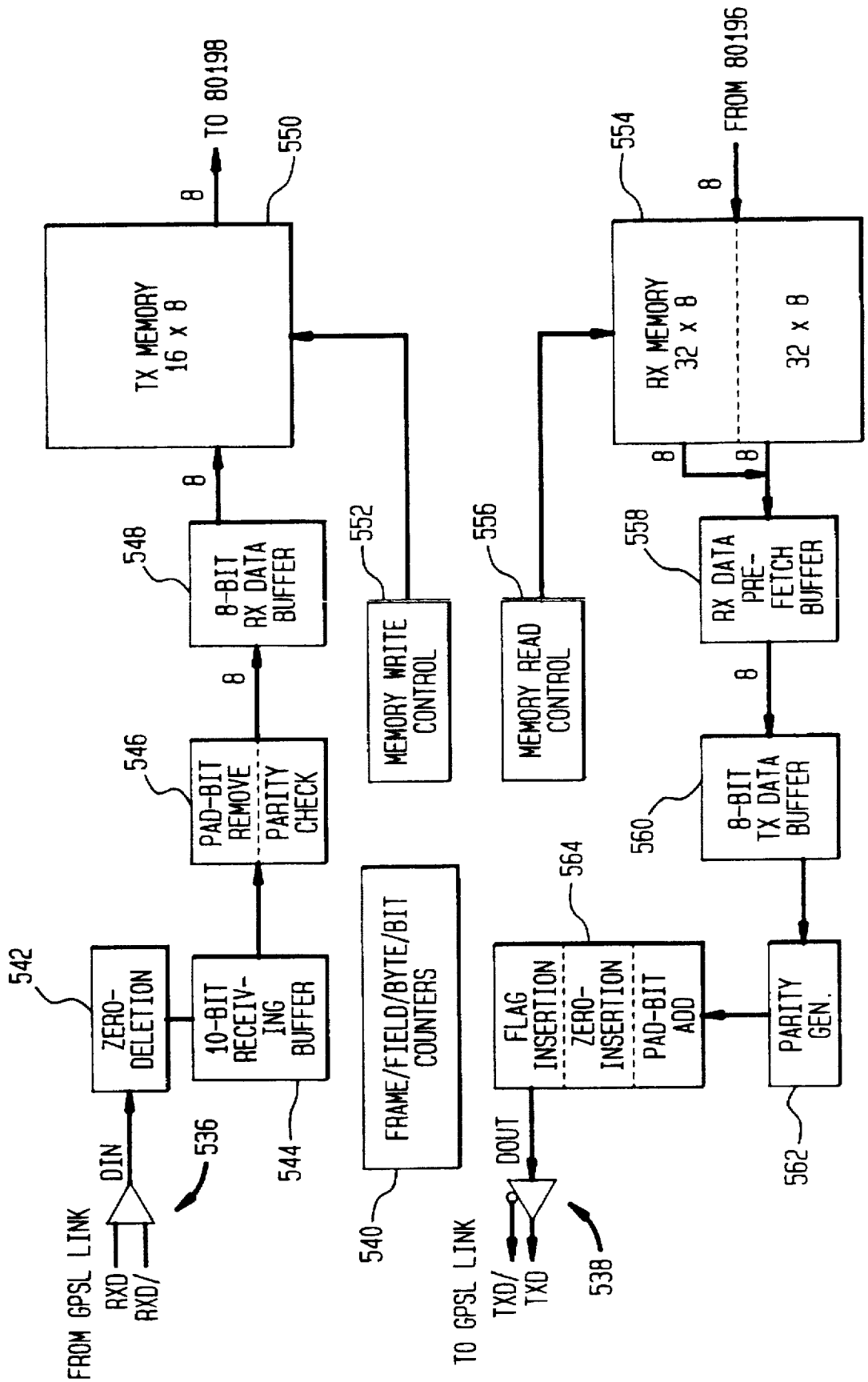
FIG. 10 is a block diagram of the GPSL master node on the device control board.

FIG. 10 shows the block diagram of a master node such as the ones shown at 306 and 308 of FIG. 6. It will be appreciated that the block diagram is very similar to that of the slave node shown in FIG. 9. In this case, for instance block 306, the master node block comprises RS-485 transceivers shown at 536 and 538. The receive line data input at 536 is fed at the appropriate time, in accordance with the timing information developed in counters shown at 540, to zero-deletion block 542, buffer 544, and thence to block 546 where the parity is checked and the data, reformatted as discussed below is stored in data buffer 548. It is then written to memory 550 under control of memory write block 552. For transmittal back to the slave node, the data is read from memory 554 under control of memory read block 556, placed in prefetch buffer 558 and transferred to buffer 560 and from thence to parity generator 562 and block 564 for transmittal in the appropriate format as described below.

Figure 11:
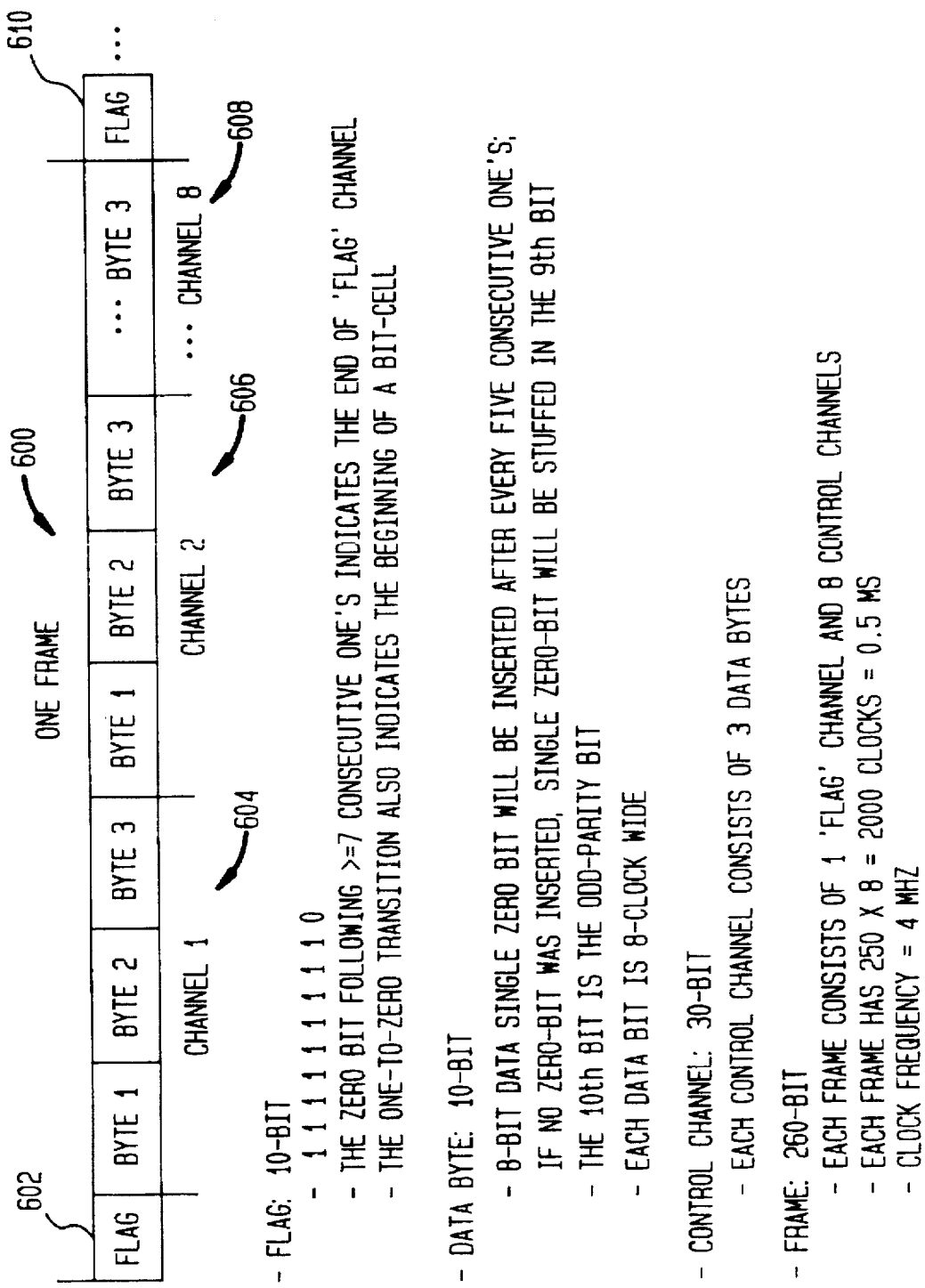
FIG. 11 shows a suitable frame format in accordance with the invention.

FIG. 11 shows the frame format of the communication link in accordance with the invention. As stated previously, the link is a multi-drop, full-duplex protocol having the receive frame and transmit frame carried on separate wires. In accordance with the invention, both receive frame and transmit have the same structure and are synchronized with each other. As seen in FIG. 11, each frame 600 comprises a flag byte 602 followed by 8 device channels, three of which are indicated at 604, 606, and 608, each channel comprising 3 bytes space. For best results, each byte contains 10 bits, including 8 data bits, 1 "zero insertion" bit, and 1 odd-parity, preferably, bit. Preferably, each bit is oversampled by 8 clock periods. For best results, it has been found that the information in each bit cell should be determined by what can be described as a majority vote. If the data signal has been high for more than three clock periods, the bit is interpreted as a ONE.

The flag byte 602 is used as a reference for frame synchronization. The preferred bit pattern for the flag is "1111111110". Whenever this pattern is detected by a slave node, internal byte and channel timers are reset. It will also be appreciated that the ONE-to Zero transition edge in the flag byte may also be used to indicate the beginning of a bit-cell.

In the preferred embodiment illustrated, a ZERO-bit is inserted after five consecutive ONE data bits. If no zero insertion within the data is required, the ZERO will be inserted at the ninth bit position. The tenth bit is used as an odd-parity bit.

It will be appreciated from the foregoing that each data channel is associated with a respective slave node (or one physical device such as the universal motor drive or Serial I/O board or the like) which has a unique address. As soon as the GPSL communication is activated, frames are repeated at a fixed rate. Each frame starts with a Flag byte, such as 602 and 610 and follows with eight data channels of three bytes each. The length of each frame is accordingly 25 bytes or 250 bits or 2000 clock periods. Thus if for example, a 4 MHz clock is used, each frame will take 0.5 ms to transmit or receive.

In accordance with the invention, the transmit frame is issued by the GPSL master node. After a GPSL communication is established, all slave nodes are searching for the Flag byte on the transmit line. When the Flag byte is detected, the slave nodes initialize their timers to synchronize them with the master node. Each slave node has a unique address which is associated with the frame's channel number. When each frame's time slot arrives, it fetches its respective 3-bytes data from the transmit frame.

A receive frame is a collection of data generated by the slave nodes. When the slave nodes respective time slot arrives, it outputs the information into the receive frame for transmittal to the master node. It will be understood that the receive frame data in the flag byte location and in any unused channels is not valid data.

The operation of the communication system will now be described. After system reset, the GPSL transmit line is held LOW. All slave nodes are in the idle state and are listening to the receive line. The GPSL communication is established by enabling a START signal of the GPSL master node and the cyclic frames are repeated every 0.5 ms until the START signal is disabled.

As mentioned above, slave nodes use the Flag byte to synchronize their internal counters. When the channel count matches the slave node's address, the slave node has reached its respective communication time slot and fetches and transmits its data via the transmit and receive lines. It will be understood that concurrently, the master node is exchanging data between the GPSL link and the external data buffers.

When the GPSL link is used to control the universal motor drive, each data bit will be associated with a specified signal. A suitable bit map is illustrated in FIG. 12.

When the GPSL link is used to interface to a Serial I/O board, each data bit will also be associated with a specified signal. A suitable bit map for the Serial I/O board is illustrated in FIG. 13.

What is claimed is:

1. An improved communication system for digital control applications, comprising:

a master node and a plurality of slave nodes;

said master node comprising:
  first means for formatting and transmitting a flag signal and other data; and
  second means for serial-to-parallel conversion and storage of data;

said plurality of slave nodes comprising:
  third means for formatting and transmitting data; and
  fourth means for serial-to-parallel conversion and latching of data received from the master node;

wherein said master node and said plurality of slave nodes are connected by transmit and receive wires for communication of data formatted into transmit frames and receive frames, said transmit frames and said receive frames being respectively carried by separate cables in full-duplex protocol, the transmit and receive frames being synchronized with each other; and each said frame comprising a flag signal for synchronization followed by a determined number of channels, each said channel having a determined number of bytes corresponding thereto, and each of said plurality of slave nodes having its own time slot on each transmit and receive frame, whereby transfers to and from all of said plurality of slave nodes are completed in each said frame, wherein said master node is a motion controller that generates motion profiles for motors and said plurality of slave nodes are motor drivers coupled to said motors.

2. The system of claim 1 wherein each of said time slots includes two data bytes and one control byte for each of said plurality of slave nodes.

3. The system of claim 1 wherein each of said each bytes comprise ten bits, and wherein eight of the bits are data bits, one of the bits is an inserted zero, and one of the bits is a parity bit.

4. The system of claim 1 wherein the connection between the master node and each of said plurality of slave nodes comprises two half duplex RS-485 links carrying two pairs of differential data signals.

* * * * *